United States Patent
Kumeuchi et al.

[11] Patent Number: 6,156,080
[45] Date of Patent: Dec. 5, 2000

[54] METHOD OF FABRICATING AN ELECTRODE USED FOR A PRISMATIC CELL

[75] Inventors: Tomokazu Kumeuchi; Muneaki Nakanishi; Junji Tabuchi, all of Tokyo; Masato Shirakata, Kanagawa, all of Japan

[73] Assignees: Nippon Mori Energy Corporation, Kanagawa; NEC Corporation, Tokyo, both of Japan

[21] Appl. No.: 09/064,604

[22] Filed: Apr. 23, 1998

[30] Foreign Application Priority Data

Apr. 24, 1997 [JP] Japan .................................. 9-107651

[51] Int. Cl.[7] .............................. H01M 6/00; H01M 4/04; H01M 4/10; H01M 4/30
[52] U.S. Cl. .......................... 29/623.1; 429/94; 429/209; 429/211
[58] Field of Search ............................. 29/623.1; 429/94, 429/209, 211

[56] References Cited

U.S. PATENT DOCUMENTS

| | | | |
|---|---|---|---|
| 5,439,760 | 8/1995 | Howard et al. | 429/94 |
| 5,443,925 | 8/1995 | Machida et al. | 429/94 |
| 5,486,215 | 1/1996 | Kelm et al. | 29/623.1 |
| 5,549,717 | 8/1996 | Takeuchi et al. | 29/623.2 |
| 5,552,239 | 9/1996 | Gozdz et al. | 429/94 |
| 5,595,835 | 1/1997 | Miyamoto et al. | 429/56 |
| 5,603,737 | 2/1997 | Marincic et al. | 29/23.1 |
| 5,658,683 | 8/1997 | Kageyama et al. | 429/94 |
| 5,746,780 | 5/1998 | Narukawa et al. | 29/623.1 |

FOREIGN PATENT DOCUMENTS

| | | |
|---|---|---|
| 60-501729 | 10/1985 | Japan . |
| 60-25264 | 2/1995 | Japan . |
| 7-226212 | 8/1995 | Japan . |
| 6-96801 | 4/1996 | Japan . |
| 8-153519 | 6/1996 | Japan . |
| 8-171917 | 7/1996 | Japan . |

*Primary Examiner*—Maria Nuzzolillo
*Assistant Examiner*—Tracy Dove
*Attorney, Agent, or Firm*—Sughrue, Mion, Zinn, Macpeak & Seas, PLLC

[57] ABSTRACT

There is provided a method of fabricating an electrode used for a prismatic cell, including the steps of (a) winding an electrode sheet around a core, the electrode sheet comprising a positive electrode in the form of a sheet, a negative electrode in the form of a sheet, and an insulating sheet sandwiched between the positive and negative electrodes, (b) pulling out the core to thereby form a wound electrode sheet deposition, (c) heating the wound electrode sheet deposition at a temperature equal to or lower than a melting temperature of the insulating sheet for 30 minutes or smaller, and (d) compressing the wound electrode sheet deposition with a uniaxial pressure to thereby flatten the wound electrode sheet deposition. In accordance with the above-mentioned method, it is possible to increase a cell capacity per a unit volume in a prismatic cell, because the electrode sheet can be wound further half turn or a plurality of times. In addition, it is also possible to increase an efficiency in a charging and discharging cycle, because a gap between the electrodes and the insulating sheet is made smaller, and a space in a center of the wound electrode sheet deposition is also made smaller, ensuring uniform reaction in the electrode.

81 Claims, 5 Drawing Sheets

METHOD OF FABRICATING AN ELECTRODE USED FOR A PRISMATIC CELL

BACKGROUND OF THE INVENTION

1. Field of the Invention

The invention relates to a method of fabricating an electrode used for a prismatic cell, and more particularly to a method of fabricating an electrode comprising a positive electrode in the form of a sheet, a negative electrode in the form of a sheet, and an insulating sheet sandwiched between the positive and negative electrodes, the electrodes and the insulating sheet being in wounded and flattened condition.

2. Description of the Related Art

As handy devices such as a note-type personal computer and a cellular phone has been recently fabricated in a smaller size and a lighter weight, a cell as a power source is required to be in a smaller size and a lighter weight accordingly. A cylindrical cell had been first used widely. However, a prismatic cell can be incorporated into a space in a handy device more efficiently than a cylindrical cell, when a cell or cells are to be incorporated into a handy device. Hence, a prismatic cell has been widely employed as a power source for a handy device.

For instance, Japanese Unexamined Patent Publication No. 6-96801 has suggested a method of fabricating an electrode used for a prismatic cell. According to the method, an electrode for a prismatic cell is formed by depositing a positive electrode and a negative electrode both in the form of a sheet with an insulating porous plastic sheet sandwiched therebetween, winding the deposition around a planar plate core, and pulling the core out of the wound deposition. In place of the planar plate core, there may be employed a core having a circular cross-section or a core having an oval cross-section. Before the thus formed electrode is inserted into a prismatic cell case, the electrode or wound deposition is compressed in a diameter-wise direction to thereby cause the electrode to have an ellipse cross-section in conformity with a shape of the prismatic cell case, as having been suggested in Japanese Unexamined Patent Publication No. 60501729 based on U.S. patent application Ser. No. 509133 filed on Jun. 29, 1983 which is further based on PCT/US84/00977.

However, a wound electrode formed by winding a deposition of sheets around a planar plate core or a core having a circular or oval cross-section often slips out of place or inwardly loosens in the vicinity of a corner at which the deposition is bent, when the deposition is compressed into an ellipse form. As a result, there is generated a gap between the positive and negative electrode sheets.

As a solution to this problem, Japanese Unexamined Patent Publications Nos. 8-153519 and 8-171917 have suggested a method including the steps of winding an electrode sheet deposition, which is comprised of a positive electrode in the form of a sheet, a negative electrode in the form of a sheet, and an insulating porous polypropylene sheet sandwiched between the positive and negative electrodes for electrical isolation therebetween, around a core having a rhombic cross-section a plurality of times, pulling the core out of the thus formed wound electrode sheet deposition, and compressing the wound electrode sheet deposition into an ellipse form. According to the Publications, it is possible to prevent the wound electrode sheet deposition from slipping out of place or loosening. The reason is as follows. That is, since the core having a rhombic cross-section has an adequate strength, an electrode sheet deposition does not bend while being wound around the core, resulting in that the wound electrode sheet deposition is not slipped out of place. Furthermore, the wound electrode sheet deposition is forced to have a bending tendency along an acute angle of the rhombic core. Hence, the wound electrode sheet deposition is compressed so that a portion having the bending tendency is made bent, ensuring that the wound electrode sheet deposition does not loose.

However, even after the thus formed wound electrode sheet deposition is incorporated into a prismatic cell case, there still exist a space located at the center of the wound electrode sheet deposition, a gap between the positive electrode sheet and the insulating plastic sheet, and a gap between the negative electrode sheet and the insulating plastic sheet. The reason why those space and gaps still exist is that the wound electrode sheet deposition is compressed as it is, namely, without any pretreatment.

Furthermore, the above-mentioned space and gaps keep a cell away from having an increased capacity.

SUMMARY OF THE INVENTION

It is an object of the present invention to provide a method of fabricating an electrode used for a prismatic cell, which method makes it possible for an electrode not to loose even when an electrode sheets deposition is wound around a core having any cross-section such as a circular one, an oval one, a plate-shaped one and a rhombic one, and not to have a space located at the center of a wound electrode sheet deposition, a gap between a positive electrode sheet and an insulating sheet, and a gap between a negative electrode sheet and an insulating sheet.

It is also an object of the present invention to provide a method of fabricating an electrode used for a prismatic cell, which method increases a cell capacity per a unit volume of a cell case in which the electrode is enclosed.

There is provided a method of fabricating an electrode used for a prismatic cell, including the steps of (a) winding an electrode sheet around a core, the electrode sheet comprising a positive electrode in the form of a sheet, a negative electrode in the form of a sheet, and an insulating sheet sandwiched between the positive and negative electrodes, (b) pulling out the core to thereby form a wound electrode sheet deposition, and (c) compressing the wound electrode sheet deposition with the wound electrode sheet deposition being kept heated, to thereby flatten the wound electrode sheet deposition.

It is preferable that the wound electrode sheet deposition is kept compressed for a certain period of time in the step (c). It is also preferable that the wound electrode sheet deposition is compressed with a uniaxial pressure or an isotropic pressure in the step (c). The isotropic pressure may be transferred through a gas or a fluid.

The wound electrode sheet deposition is preferably kept at a temperature equal to or lower than a melting temperature of the insulating sheet in the step (c). Hence, a temperature range in which the wound electrode sheet deposition is heated varies in dependence on a material of which the insulating sheet is composed. For instance, when the insulating sheet is composed of polyethylene (PE), the wound electrode sheet deposition is kept at a temperature preferably in the range of 30 to 130 degrees centigrade both inclusive, and more preferably in the range of 60 to 120 degrees centigrade both inclusive. For instance, when the insulating sheet is composed of polypropylene (PP), the wound electrode sheet deposition is kept at a temperature preferably in the range of 30 to 160 degrees centigrade both inclusive, and more preferably in the range of 60 to 150 degrees centigrade both inclusive. When the insulating sheet has a multi-layered structure composed of a polypropylene film (PP), a polyethylene film (PE), and a polypropylene film (PP), the wound electrode sheet deposition is kept at a temperature preferably in the range of 30 to 130 degrees centigrade both inclusive, and more preferably in the range of 60 to 120 degrees centigrade both inclusive.

It is preferable that the wound electrode sheet deposition is compressed in the step (c) under a reduced pressure. The mold is preferably designed to have an inner width smaller than an inner width of a cell case into which the wound electrode sheet deposition is to be inserted.

There is further provided a method of fabricating an electrode used for a prismatic cell, including the steps of (a) winding an electrode sheet around a core, the electrode sheet comprising a positive electrode in the form of a sheet, a negative electrode in the form of a sheet, and an insulating sheet sandwiched between the positive and negative electrodes, (b) pulling out the core to thereby form a wound electrode sheet deposition, (c) heating the wound electrode sheet deposition, and (d) compressing the wound electrode sheet deposition to thereby flatten the wound electrode sheet deposition.

For instance, the wound electrode sheet deposition is heated for 30 minutes or smaller in the step (c). It is preferable to heat the wound electrode sheet deposition while being compressed in said step (d).

There is still further provided a method of fabricating an electrode used for a prismatic cell, including the steps of (a) winding an electrode sheet around a core, the electrode sheet comprising a positive electrode in the form of a sheet, a negative electrode in the form of a sheet, and an insulating sheet sandwiched between the positive and negative electrodes, (b) pulling out the core to thereby form a wound electrode sheet deposition, (c) fixing the wound electrode sheet deposition in a mold having an inner width smaller than an inner width of a cell case into which the wound electrode sheet deposition is to be inserted, (d) inserting the wound electrode sheet deposition and the mold into a bag composed of soft plastic, (e) thermally sealing the wound electrode sheet deposition and the mold in the bag, and (f) compressing the wound electrode sheet deposition with the wound electrode sheet deposition being kept heated, to thereby flatten the wound electrode sheet deposition.

For instance, the soft plastic bag may be composed of thermoplastic polymer such as polyethylene, polypropylene, nylon, or a combination thereof.

There is yet further provided a method of fabricating an electrode used for a prismatic cell, including the steps of (a) winding an electrode sheet around a core, the electrode sheet comprising a positive electrode in the form of a sheet, a negative electrode in the form of a sheet, and an insulating sheet sandwiched between the positive and negative electrodes, (b) pulling out the core to thereby form a wound electrode sheet deposition, (c) fixing the wound electrode sheet deposition in a mold having an inner width smaller than an inner width of a cell case into which the wound electrode sheet deposition is to be inserted, (d) inserting the wound electrode sheet deposition and the mold into a bag composed of soft plastic, (e) thermally sealing the wound electrode sheet deposition and the mold in the bag, (f) heating the wound electrode sheet deposition, and (g) compressing the wound electrode sheet deposition to thereby flatten the wound electrode sheet deposition.

There is still yet further provided a method of fabricating an electrode used for a prismatic cell, including the steps of (a) winding an electrode sheet around a core, the electrode sheet comprising a positive electrode in the form of a sheet, a negative electrode in the form of a sheet, and an insulating sheet sandwiched between the positive and negative electrodes, (b) pulling out the core to thereby form a wound electrode sheet deposition, (c) fixing the wound electrode sheet deposition in a mold having an inner width smaller than an inner width of a cell case into which the wound electrode sheet deposition is to be inserted, (d) inserting the wound electrode sheet deposition into a bag composed of soft plastic, (e) thermally sealing the wound electrode sheet deposition in the bag; and (f) compressing the wound electrode sheet deposition with the wound electrode sheet deposition being kept heated, to thereby flatten the wound electrode sheet deposition.

There is further provided a method of fabricating an electrode used for a prismatic cell, including the steps of (a) winding an electrode sheet around a core, the electrode sheet comprising a positive electrode in the form of a sheet, a negative electrode in the form of a sheet, and an insulating sheet sandwiched between the positive and negative electrodes, (b) pulling out the core to thereby form a wound electrode sheet deposition, (c) inserting the wound electrode sheet deposition into a bag composed of soft plastic, (d) thermally sealing the wound electrode sheet deposition in the bag, (e) fixing the wound electrode sheet deposition in a mold having an inner width smaller than an inner width of a cell in which the electrode is to be inserted, (f) heating the wound electrode sheet deposition, and (g) compressing the wound electrode sheet deposition to thereby flatten the wound electrode sheet deposition.

The order of carrying out the steps (e) and (f) is not fixed. The step (e) may be carried out earlier than the step (f), or the step (f) may be carried out earlier.

In accordance with the present invention, an electrode in the form of a wound sheet deposition is compressed with the electrode being kept at a high temperature before the electrode is encased into a cell case. By compressing at a high temperature, a space located at the center of the wound sheet deposition, a gap between a positive electrode sheet and an insulating sheet, and a gap between a negative electrode sheet and an insulating sheet are all eliminated. Hence, a deposition sheet can be further wound by half a turn or a plurality of turns, if the deposition sheet were encased into the same size cell case. Thus, it is now possible to increase a capacity of a cell.

In addition, the elimination of the above-mentioned space and gaps ensures uniform reaction in a cell, which further ensures an efficiency of charging and discharging cycles.

Furthermore, it is possible to prevent an electrode from being improperly encased into a cell case.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

[First Embodiment]

Figure 1:
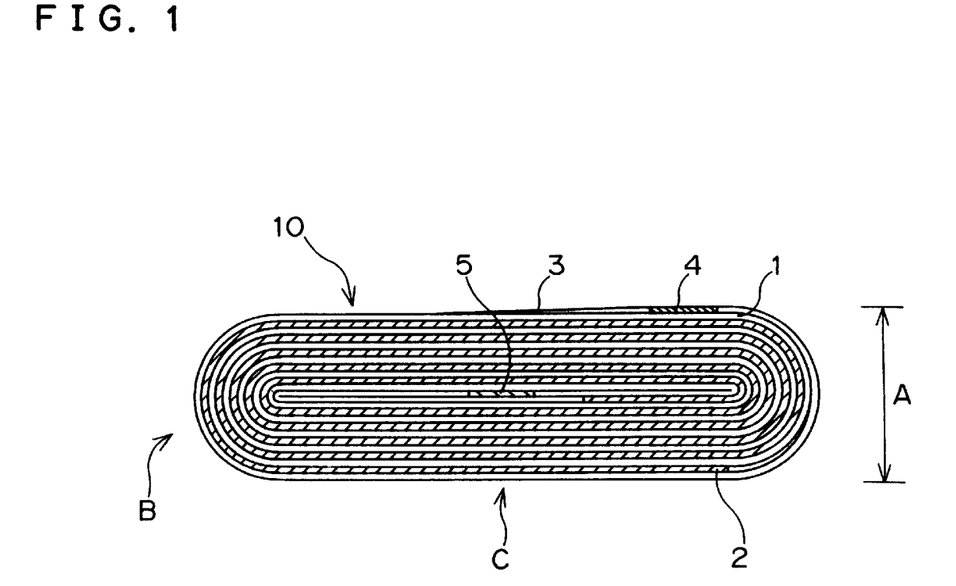
FIG. 1 is a cross-sectional view illustrating an electrode fabricated in accordance with the first embodiment.

FIG. 1 illustrates an electrode used for a prismatic cell, fabricated in accordance with the first embodiment. The illustrated electrode 10 is in the form of a wound electrode sheet deposition. The electrode sheet deposition is comprised of a negative electrode 1 in the form of a sheet, a positive electrode 2 in the form of a sheet, and a porous plastic sheet 3 sandwiched between the negative and positive sheet electrodes 1 and 2. The porous plastic sheet 3 acts as an insulator for electrically insulating the negative and positive sheet electrodes 1 and 2 from each other. The electrode 10 is formed at one end thereof with a negative electrode tab 4 electrically connected to the negative sheet electrode 1, and is further formed at the other end with a positive electrode tab 5 electrically connected to the positive sheet electrode 2.

The electrode 10 is formed by compressing the wound electrode sheet deposition in a diameter-wise direction, namely, in a direction A so that there exists no space at the center of the wound electrode sheet deposition, no gap between the positive electrode sheet 2 and the porous plastic sheet 3, and no gap between the negative electrode sheet 1 and the porous plastic sheet 3.

The electrode 10 in accordance with the instant embodiment was fabricated as follows.

As a negative electrode active material was employed carbon material into which lithium (Li) ions can be doped and from which lithium ions can be removed, such as mesophase carbon microbeads. As a positive electrode active material was employed a transition metal oxide containing lithium therein, such as lithium manganate.

The negative electrode 1 in the form of sheet was fabricated as follows. First, a binder, and an electrical conductor, if necessary, were mixed with the above-mentioned negative electrode active material. Then, there was made slurry by dispersing the negative electrode active material containing a binder and an electrical conductor in dispersion medium. Then, the slurry was applied onto a current collector sheet composed of copper and having a thickness of 10 $\mu$m. Then, the current collector sheet on which the slurry was applied was dried, and compressed. Thus, there was completed the negative sheet electrode 1 which had a width of 39 mm and a length of 500 mm.

The positive electrode 2 in the form of sheet was fabricated as follows. First, a binder, and an electrical conductor, if necessary, were mixed with the above-mentioned positive electrode active material. Then, there was made slurry by dispersing the positive electrode active material containing a binder and an electrical conductor in dispersion medium. Then, the slurry was applied onto a current collector sheet composed of aluminum and having a thickness of 20 $\mu$m. Then, the current collector sheet on which the slurry was applied was dried, and compressed. Thus, there was completed the positive sheet electrode 2 which had a width of 37 mm and a length of 435 mm.

Then, there was prepared a porous plastic sheet 3 as an insulator. There may be employed a polyethylene (PE) sheet, a polypropylene (PP) sheet, or a sheet having a PP/PE/PP multi-layered structure as the porous plastic sheet 3. Then, the positive electrode sheet 2, the porous plastic sheet 3, the negative electrode sheet 1, and the porous plastic sheet 3 were deposited in this order to thereby form a wound electrode sheet deposition 10 in such a manner as described hereinbelow.

Figure 2A:
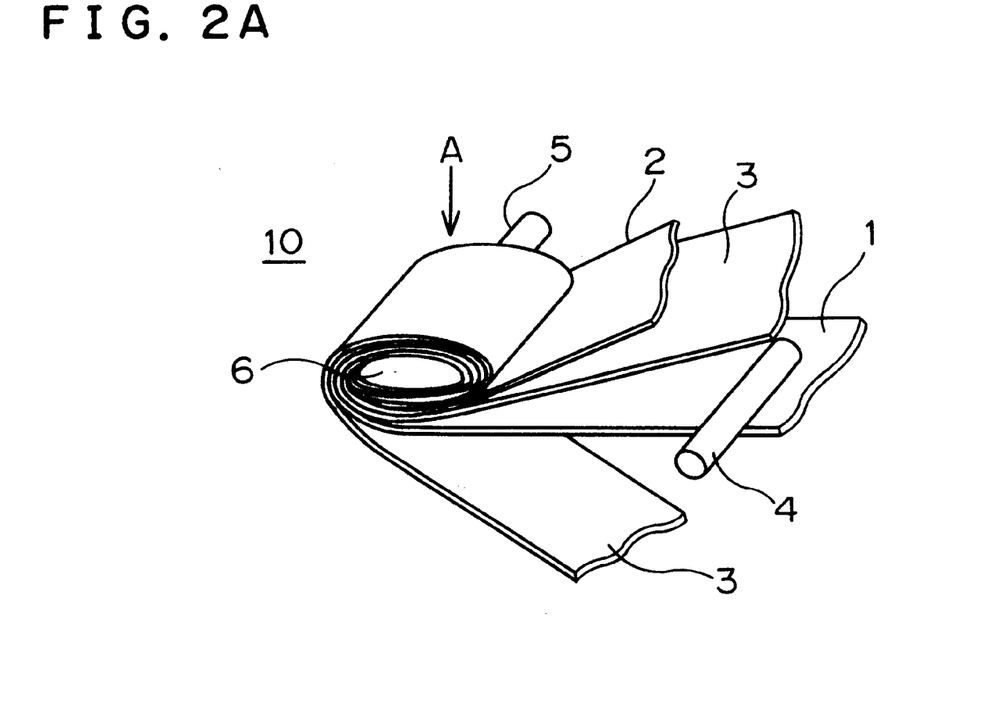
FIG. 2A is a perspective view illustrating a positive electrode sheet, a negative electrode sheet and a plastic sheet being wound around a core.

As illustrated in FIG. 2A, the positive electrode sheet 2 was first wound around an oval core 6. Then, the porous plastic sheet 3 was wound around the positive electrode sheet 2. Then, the negative electrode sheet 1 was wound around the porous plastic sheet 3, and the porous plastic sheet 3 was wound again around the negative electrode sheet 1. That is, the negative and positive electrode sheets 1 and 2 were wound around the oval core 6 so that they are always sandwiched between the porous plastic sheets 3.

As also illustrated in FIG. 2A, the negative electrode tab 4 is sandwiched between any one of the negative plastic sheets 1 and the porous plastic sheet 3 adjacent thereto. Similarly, the positive electrode tab 5 is sandwiched between any one of the positive plastic sheets 2 and the porous plastic sheet 3 adjacent thereto.

Figure 2B:
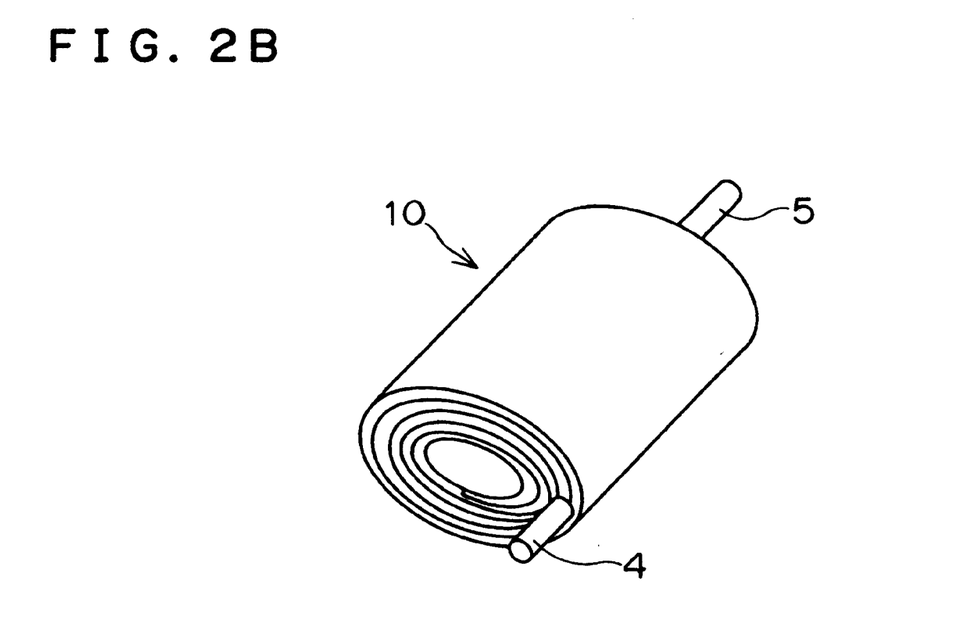
FIG. 2B is a perspective view illustrating a wound electrode deposition.

An end of the porous plastic sheet 3 at a final turn was adhered to a surface of the previous turn with an adhesive tape (not illustrated). Then, the oval core 6 was pulled out of the wound electrode sheet deposition. Thus, the wound electrode sheet deposition 10 was formed, as illustrated in FIG. 2B. Thereafter, the thus formed wound electrode sheet deposition 10 was compressed in a direction A.

The wound electrode sheet deposition 10 was compressed by means of a hydraulic, uniaxial compressor equipped with a heater. This compressor can compress an object with the object being heated. A heater may be prepared separately from a compressor, and may be concurrently used together with a compressor when the wound electrode sheet deposition 10 is compressed.

The wound electrode sheet deposition 10 was heated while compressed at a temperature equal to or smaller than a melting temperature of the porous plastic sheet 3. For instance, when a polyethylene (PE) sheet is used as the porous plastic sheet 3, the wound electrode sheet deposition 10 is heated at a temperature in the range of about 30 to about 130 degrees centigrade, the latter is a melting point of PE, and more preferably in the range of about 60 to about 120 degrees centigrade. When a polypropylene (PP) sheet is used as the porous plastic sheet 3, the wound electrode sheet deposition 10 is heated at a temperature in the range of about 30 to about 160 degrees centigrade, the latter is a melting point of PP, and more preferably in the range of about 60 to about 150 degrees centigrade. When a sheet having a PP/PE/PP multi-layered structure is used as the porous plastic sheet 3, the wound electrode sheet deposition 10 is heated at a temperature in the range of about 30 to about 130 degrees centigrade, the latter is a melting point of PE which is smaller than a melting point of PP, and more preferably in the range of about 60 to about 120 degrees centigrade.

Figure 3:
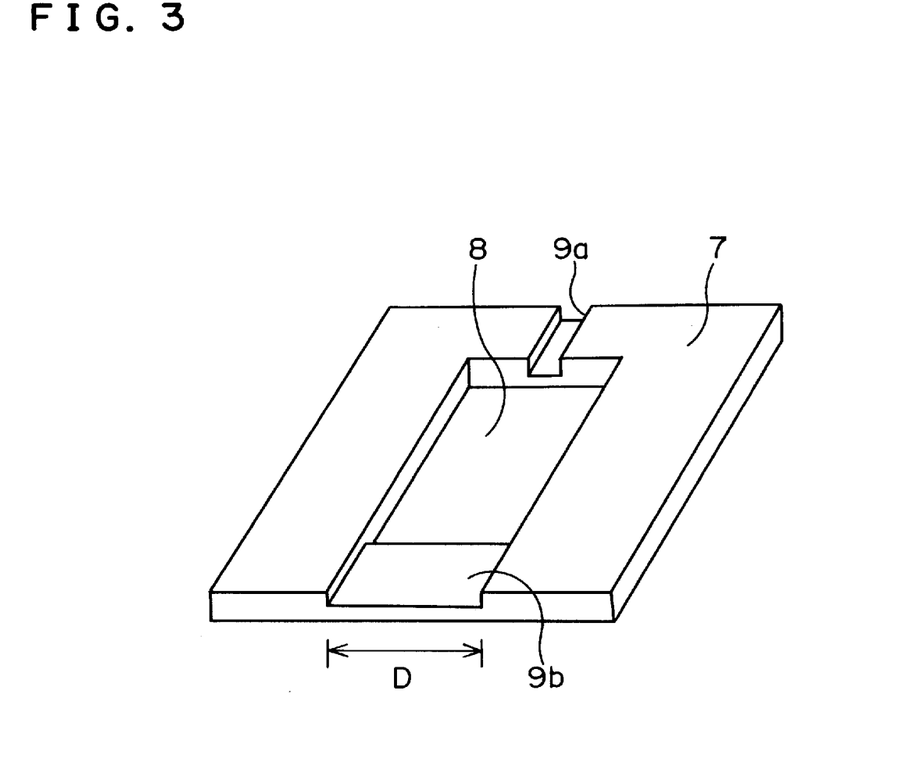
FIG. 3 is a perspective view illustrating a mold into which a wound electrode sheet deposition is fixed for compression.

The wound electrode sheet deposition 10 was inserted into and fixed in a mold 7 illustrated in FIG. 3. The mold 7 is formed with a rectangular opening 8 into which the wound electrode sheet deposition 10 is inserted. The rectangular opening 8 has a width D. The mold 7 is formed further with a first recess 9a and a second recess 9b. The opening 8 is in communication at opposite ends thereof with atmosphere through the first and second recesses 9a and 9b. The first recess 9a has a width smaller than the width D of the opening 8, whereas the second recess 9b has a width equal to the width D of the opening 8.

The width D of the rectangular opening 8 is designed to be smaller than an inner width of a cell case by 0.5 mm to 5 mm. This is to prevent a width of the wound electrode sheet deposition 10 from expanding beyond an inner width of a cell case after having been compressed with being heated.

Then, the wound electrode sheet deposition 10 fixed in the mold 7 was compressed by means of the above-mentioned hydraulic, uniaxial compressor with the wound electrode sheet deposition 10 being heated at a temperature equal to or lower than a melting point of the porous plastic sheet 3. In the first embodiment, the wound electrode sheet deposition 10 was compressed at 80 degrees centigrade.

The wound electrode sheet deposition 10 was compressed at such a pressure that the positive electrode sheet 2 was not short-circuited with the negative electrode sheet 1 in order to prevent the porous plastic sheet 3 from being damaged by compression of the wound electrode sheet deposition 10. If the porous plastic sheet 3 was damaged, the positive electrode sheet 2 made contact with and hence short-circuited with the negative electrode sheet 1.

The wound electrode sheet deposition 10 may be kept compressed at the above-mentioned pressure and heated for a certain period of time, which is, for instance. in the range of 5 seconds to 180 seconds.

Before the wound electrode sheet deposition 10 was compressed, the wound electrode sheet deposition 10 might be kept heated in advance at a temperature equal to or lower than a melting point of the porous plastic sheet 3 for 30 minutes or smaller. If the wound electrode sheet deposition 10 was compressed before it was sufficiently heated, there is generated a difference among portions of the wound electrode sheet deposition 10 with respect to a degree of softening thereof. This results in stress concentration which causes the positive and/or negative electrode active material (s) to partially peel off the current collector sheet. To avoid this, it is preferable to in advance heat the wound electrode sheet deposition 10 before it is compressed.

Thus, the wound electrode sheet deposition 10 was flattened having an ellipse cross-section by compression.

Figure 4:
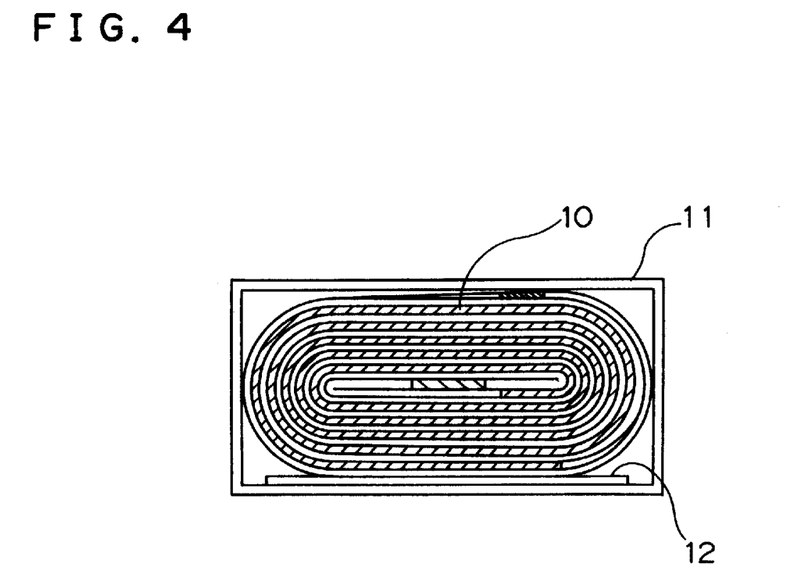
FIG. 4 is a cross-sectional view illustrating the electrode illustrated in FIG. 1, encased into a cell case.

Then, as illustrated in FIG. 4, the thus formed flattened, wound electrode sheet deposition 10 was encased into a rectangular cell case 11 composed of stainless steel or nickel-plated iron with a spring plate 12 being sandwiched between the wound electrode sheet deposition 10 and an inner wall of the cell case 11. Then, the wound electrode sheet deposition 10 was covered at upper and lower surfaced thereof with insulating sheets or plates (not illustrated).

Then, the positive electrode tab 5 was welded to a cell cover (not illustrated), and the negative electrode tab 4 was welded to the cell case 11. Thereafter, the cell cover and the cell case 11 were welded to each other by means of laser. After an electrolyte was poured into the cell case 11 through an electrolyte inlet (not illustrated), the electrolyte inlet was closed to thereby seal the cell case 11. Thus, there is completed a prismatic cell.

In the instant embodiment, the followings are used as a solvent for the prismatic cell: propylene carbonate; ethylene carbonate; diethyl carbonate; dimethyl carbonate; methyl ethyl carbonate; 1,2-dimethoxy ethane; 1,2-diethoxy ethane; γ-butylolactone; tetrahydrofuran; 1,3-dioxoran; 4-methyl-1,3-dioxoran; diethyl ether; sulforan; methylsulforan; acetonitrile; and propyonitrile, alone or in combination.

The followings are used as a supporting electrode for the prismatic cell: $LiCiO_4$; $LiAsF_6$; $LiPF_6$; $LiBF_4$; $LiB(C_6H_5)_4$; LiCl; LiBr; $CH_3SO_3Li$; and $CF_3SO_3Li$.

It is possible to considerably enhance a cell capacity by carrying out the above-mentioned compression of the wound electrode sheet deposition 10. The compression causes the wound electrode sheet deposition 10 to be flattened or decreased in thickness in the direction A in FIG. 1. Hence, the electrode sheet deposition comprising the deposited structure of the negative electrode sheet 1, the porous plastic sheet 3, and the positive electrode sheet 2 can be wound around the core 6 (see FIG. 2A) further by a half turn or a plurality of turns in dependence on the flattened degree of the wound electrode sheet deposition 10. As a result, a resultant prismatic cell can have an increased cell capacity accordingly.

If a cell capacity might be kept not increased or as it is, a cell case may be made smaller in thickness. Thus, it is possible to increase both a cell capacity per a unit volume of a cell and a cell capacity per a unit weight of a cell.

By carrying out the compression of the wound electrode sheet deposition 10, it is possible to eliminate a space existing at a center of the wound electrode sheet deposition 10, a gap between the positive electrode sheet 2 and the porous plastic sheet 3, and a gap between the negative electrode sheet 1 and the porous plastic sheet 3. As a result, a reaction in the electrodes becomes uniform, ensuring no reduction and no dispersion in a cell capacity, and further ensuring prevention of deterioration in a cycle efficiency in charging and discharging.

[Second Embodiment]

First, the wound electrode sheet deposition 10 was fabricated in the same manner as that of the above-mentioned first embodiment. The wound electrode sheet deposition 10 was inserted into and fixed in the mold 7 illustrated in FIG. 3, similarly to the first embodiment.

Figure 5:
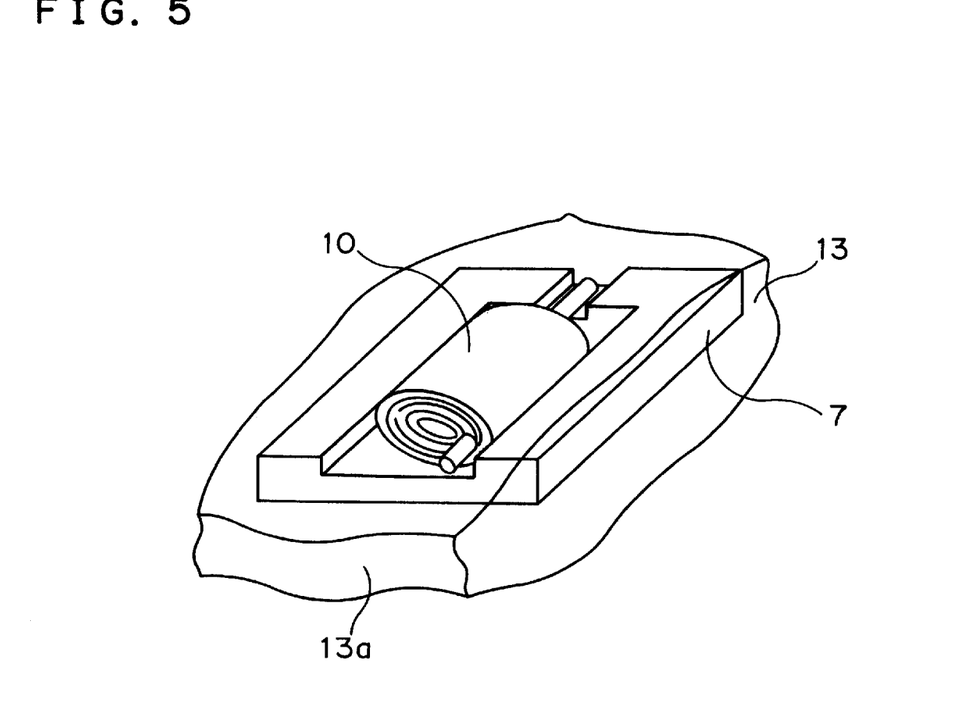
FIG. 5 is a perspective view illustrating that a wound electrode sheet deposition fixed in a mold is inserted into a soft plastic bag in the second embodiment.

Then, the wound electrode sheet deposition 10 together with the mold 7 was inserted into a soft plastic bag 13 through an opening 13a of the bag 13, as illustrated in FIG. 5. The soft plastic bag 13 may be composed of polyethylene, polypropylene or nylon, for instance. Then, the soft plastic bag 13 in which the wound electrode sheet deposition 10 and the mold 7 are inserted was reduced in pressure, and was thermally sealed so that the inside of the soft plastic bag 13 was in vacuum. By reducing a pressure in the soft plastic bag 13, air among the positive electrode sheet 2, the porous plastic sheet 3, and the negative electrode sheet 1 is discharged, resulting in that the wound electrode sheet deposition 10 can be compressed more intensively.

Then, the wound electrode sheet deposition 10 sealed in the plastic bag 13 was compressed by means of an isotropic-pressure press with the wound electrode sheet deposition 10 being kept heated at a temperature equal to or lower than a melting point of the porous plastic sheet 3. In the second embodiment, the wound electrode sheet deposition 10 was compressed with being heated at 90 degrees centigrade. By heating the wound electrode sheet deposition 10, the soft plastic bag 13 was cured, and accordingly, adhered closely to the wound electrode sheet deposition 10 and the mold 7.

For the same reason as the first embodiment, the wound electrode sheet deposition 10 was compressed at such a pressure that the positive electrode sheet 2 was not short-circuited with the negative electrode sheet 1 in order to prevent the porous plastic sheet 3 from being damaged by compression.

Similarly to the first embodiment, it is preferable to keep the wound electrode sheet deposition 10 compressed for a certain period of time, for instance, in the range of 5 seconds to 180 seconds.

For the same reason as the first embodiment, it is preferable that the wound electrode sheet deposition 10 is kept heated at a temperature equal to or lower than a melting point of the porous plastic sheet 3 for 30 minutes or smaller.

As a medium for transferring a pressure in the above-mentioned compression, there may be used a gas or a liquid. When a gas is to be used, an inert gas is preferably used. Specifically, a nitrogen gas or air is preferably used. When a liquid is to be used, water is preferably used.

After the compression of the wound electrode sheet deposition 10 was finished, the wound electrode sheet deposition 10 was taken out from the mold 7. By taking the wound electrode sheet deposition 10 out from the mold 7, the soft plastic bag 13 was broken out, and as a result, the wound electrode sheet deposition 10 was covered at upper and lower surfaces thereof with the cured plastic film, which acts as an insulator for electrically insulating the wound electrode sheet deposition 10 from a cell case when the wound electrode sheet deposition 10 is encased into the cell case.

The compression of the wound electrode sheet deposition 10 while being heated makes it possible to considerably enhance a cell capacity. In a wound electrode sheet deposition having the great number of turns, fabricated in accordance with the conventional methods, since a gap between positive and negative electrode sheets tends to become great in side portions B (see FIG. 1), the side portions B tends to have a greater thickness than that of a central portion C, and hence, it was quite difficult to effectively use the side portions B. However, in accordance with the instant embodiment, it is possible to form the side portions B to have the same thickness as that of the central portion C by isotropically compressing the wound electrode sheet deposition 10. Hence, it is now possible to effectively use the side portions B, which ensures an increase in a cell capacity.

It is possible to considerably enhance a cell capacity by carrying out the above-mentioned compression of the wound electrode sheet deposition 10. The compression causes the wound electrode sheet deposition 10 to be flattened or decreased in thickness in the direction A in FIG. 1. Hence, the electrode sheet deposition comprising the deposited structure of the negative electrode sheet 1, the porous plastic sheet 3, and the positive electrode sheet 2 can be wound around the core 6 (see FIG. 2A) further by a half turn or a plurality of turns in dependence on the flattened degree of the wound electrode sheet deposition 10. As a result, a resultant prismatic cell can have an increased cell capacity accordingly.

If a cell capacity might be kept not increased or as it is, a cell case may be made smaller in thickness. Thus, it is possible to increase both a cell capacity per a unit volume of a cell and a cell capacity per a unit weight of a cell.

By carrying out the compression of the wound electrode sheet deposition 10, it is possible to eliminate a space existing at a center of the wound electrode sheet deposition 10, a gap between the positive electrode sheet 2 and the porous plastic sheet 3, and a gap between the negative electrode sheet 1 and the porous plastic sheet 3. As a result, a reaction in the electrodes becomes uniform, ensuring no reduction and no dispersion in a cell capacity, and further ensuring prevention of deterioration in a cycle efficiency in charging and discharging.

[Third Embodiment]

Figure 6:
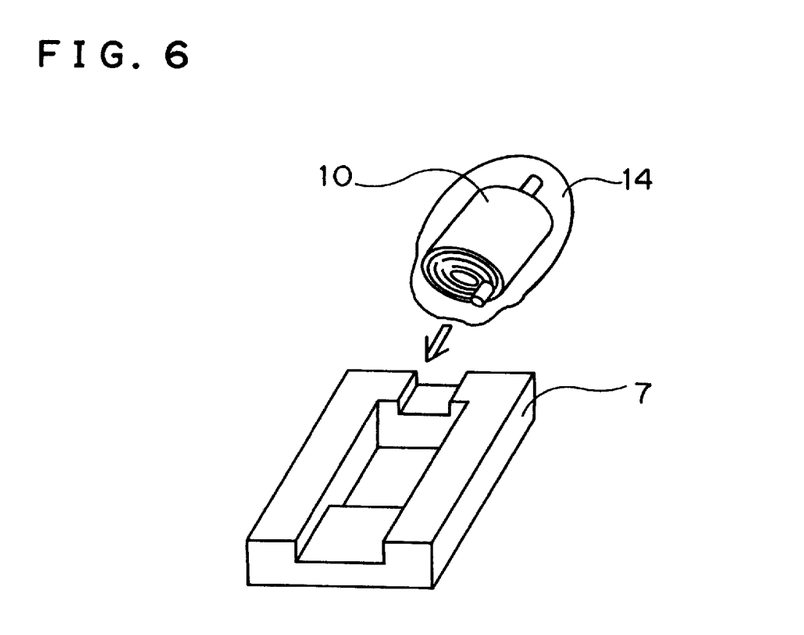
FIG. 6 is a perspective view illustrating that a wound electrode sheet deposition inserted in a soft plastic bag is going to be fit into a mold in the third embodiment.

First, the wound electrode sheet deposition 10 was fabricated in the same manner as that of the above-mentioned first embodiment. Then, the wound electrode sheet deposition 10 was inserted into a soft plastic bag 14, as illustrated in FIG. 6. The soft plastic bag 14 may be composed of polyethylene, polypropylene or nylon, for instance, similarly to the soft plastic bag 13 in the second embodiment. Then, the soft plastic bag 14 in which the wound electrode sheet deposition 10 was inserted is reduced in pressure, and was thermally sealed so that the inside of the soft plastic bag 14 was in vacuum.

The wound electrode sheet deposition 10 inserted in the soft plastic bag 14 was fitted into and fixed in the rectangular opening 8a of the mold 7 illustrated in FIG. 6.

Then, the wound electrode sheet deposition 10 sealed in the plastic bag 14 was compressed by means of an isotropic-pressure press with the wound electrode sheet deposition 10 being kept heated at a temperature equal to or lower than a melting point of the porous plastic sheet 3. By heating the wound electrode sheet deposition 10, the soft plastic bag 14 was cured, and accordingly, adhered closely to the wound electrode sheet deposition 10.

For the same reason as the first embodiment, the wound electrode sheet deposition 10 was compressed at such a pressure that the positive electrode sheet 2 was not short-circuited with the negative electrode sheet 1 in order to prevent the porous plastic sheet 3 from being damaged by compression.

Similarly to the first embodiment, it is preferable to keep the wound electrode sheet deposition 10 compressed for a certain period of time, for instance, in the range of 5 seconds to 180 seconds.

For the same reason as the first embodiment, it is preferable that the wound electrode sheet deposition 10 is kept heated at a temperature equal to or lower than a melting point of the porous plastic sheet 3 for 30 minutes or smaller.

After the compression of the wound electrode sheet deposition 10 was finished, the wound electrode sheet deposition 10 was taken out from the mold 7. The wound electrode sheet deposition 10 was covered at an outer surface thereof with the cured plastic film, which acts as an insulator for electrically insulating the wound electrode sheet deposition 10 from a cell case when the wound electrode sheet deposition 10 is encased into the cell case.

The instant embodiment provides the same advantages as those of the second embodiment. In addition, the instant embodiment provides an additional advantage that the wound electrode sheet deposition 10 is entirely covered with an insulating protection film comprised of cured plastic. Hence, when the wound electrode sheet deposition 10 is encased into a cell case, it is no longer necessary to electrically insulate the wound electrode sheet deposition 10 from the cell case.

[Reference Sample]

In order to verify the advantages of the method in accordance with the present invention, there was fabricated a wound electrode sheet deposition by compressing an electrode sheet deposition in the same manner as the first embodiment except that the wound electrode sheet deposition in accordance with the reference sample was not kept heated while compressed unlike the first embodiment.

Figure 7:
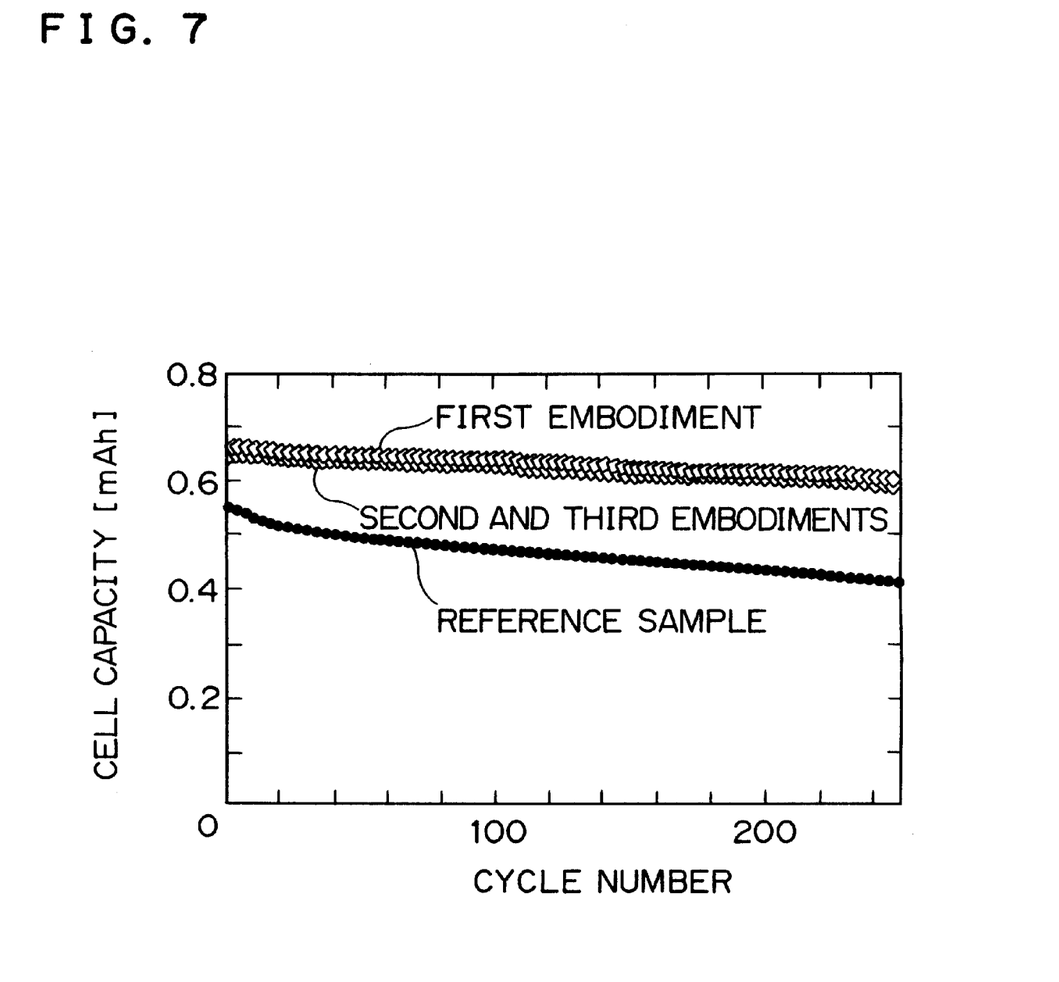
FIG. 7 is a graph illustrating cycle efficiencies of four prismatic cells each including electrodes in accordance with the first to third embodiments, and an electrode in accordance with a reference sample.

The wound electrode sheet depositions 10 fabricated in accordance with the first, second and third embodiments and the reference sample were encased into cell cases having the same shape and dimensions, to thereby fabricate four prismatic cells. FIG. 7 illustrates cycle characteristics of those four prismatic cells.

There was employed an electrolytic solution including LiPF$_6$ as a supporting electrode, and a mixture solvent of ethylene carbonate and diethylcarbonate.

As is obvious in view of FIG. 7, the prismatic cells including the wound electrode sheet depositions 10 fabricated in accordance with the first to third embodiments have a considerably increased capacity in comparison with the prismatic cell including the wound electrode sheet deposition in accordance with the reference sample.

As is also obvious in view of FIG. 7, the prismatic cells including the wound electrode sheet depositions 10 fabricated in accordance with the first to third embodiments have an enhanced cycle efficiency in charging and discharging in comparison with the prismatic cell including the wound electrode sheet deposition in accordance with the reference sample. This is because gaps among the negative electrode sheet 1, the porous plastic sheet 3, and the positive electrode sheet 2 are eliminated with the result of uniform reaction in the wound electrode sheet deposition 10.

The above-mentioned first to third embodiments provide an additional advantage that the wound electrode sheet deposition 10 can be more readily encased into a cell case than the wound electrode sheet deposition fabricated in accordance with the reference sample. This is because the porous plastic sheet 3 or the negative electrode sheet 1 at an outermost turn in the wound electrode sheet deposition 10 is quite closely adhered to an adjacent turn.

The inventors had also checked a fraction defective for encasing a wound electrode sheet deposition into a cell case. The fraction defectives were 0% for both the wound electrode sheet depositions 10 fabricated in accordance with the first to third embodiments. whereas the fraction defective was 3% for the wound electrode sheet deposition fabricated in accordance with the reference sample. Thus, the first to third embodiments considerably improve a fraction defective for encasing a wound electrode sheet deposition into a cell case.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-107651 filed on Apr. 24, 1997 including specification, claims, drawings and summary is incorporated herein by reference in its entirety.

What is claimed is:

1. A method of fabricating an electrode used for a prismatic cell, comprising the steps of:
   (a) winding an electrode sheet around a core, said electrode sheet comprising a positive electrode in the form of a sheet, a negative electrode in the form of a sheet, and an insulating sheet sandwiched between said positive and negative electrodes;
   (b) pulling out said core to thereby form a wound electrode sheet deposition; and
   (c) simultaneously compressing and heating said wound electrode sheet deposition, to thereby flatten said wound electrode sheet deposition.

2. The method as set forth in claim 1, wherein said wound electrode sheet deposition is kept compressed for a period of time ranging from 5 seconds to 180 seconds in said step (c).

3. The method as set forth in claim 1, wherein said wound electrode sheet deposition is compressed with a uniaxial pressure in said step (c).

4. The method as set forth in claim 1, wherein said wound electrode sheet deposition is compressed with an isotropic pressure in said step (c).

5. The method as set forth in claim 4, wherein said isotropic pressure is transferred through one of gas and fluid.

6. The method as set forth in claim 1, wherein said wound electrode sheet deposition is kept at a temperature equal to or lower than a melting temperature of said insulating sheet in said step (c).

7. The method as set forth in claim 6, wherein said insulating sheet is composed of polyethylene (PE), and wherein said wound electrode sheet deposition is kept at a temperature in the range of 30 to 130 degrees centigrade both inclusive.

8. The method as set forth in claim 6, wherein said insulating sheet is composed of polypropylene (PP), and wherein said wound electrode sheet deposition is kept at a temperature in the range of 30 to 160 degrees centigrade both inclusive.

9. The method as set forth in claim 6, wherein said insulating sheet has a multi-layered structure composed of a polypropylene film (PP), a polyethylene film (PE), and a polypropylene film (PP), and wherein said wound electrode sheet deposition is kept at a temperature in the range of 30 to 130 degrees centigrade both inclusive.

10. A method of fabricating an electrode used for a prismatic cell, comprising the steps of:
    (a) winding an electrode sheet around a core, said electrode sheet comprising a positive electrode in the form of a sheet, a negative electrode in the form of a sheet, and an insulating sheet sandwiched between said positive and negative electrodes;
    (b) pulling out said core to thereby form a wound electrode sheet deposition;
    (c) heating prior to compressing said wound electrode sheet deposition; and then
    (d) compressing said wound electrode sheet deposition to thereby flatten said wound electrode sheet deposition.

11. The method as set forth in claim 10, wherein said wound electrode sheet deposition is heated for 30 minutes or smaller in said step (c).

12. The method as set forth in claim 10, wherein said wound electrode sheet deposition is kept compressed for a period of time ranging from 5 seconds to 180 seconds in said step (d).

13. The method as set forth in claim 10, wherein said wound electrode sheet deposition is compressed with a uniaxial pressure in said step (d).

14. The method as set forth in claim 10, wherein said wound electrode sheet deposition is compressed with an isotropic pressure in said step (d).

15. The method as set forth in claim 14, wherein said isotropic pressure is transferred through one of gas and fluid.

16. The method as set forth in claim 10, wherein said wound electrode sheet deposition is kept at a temperature equal to or lower than a melting temperature of said insulating sheet in said step (c).

17. The method as set forth in claim 16, wherein said insulating sheet is composed of polyethylene (PE), and wherein said wound electrode sheet deposition is kept at a temperature in the range of 30 to 130 degrees centigrade both inclusive.

18. The method as set forth in claim 16, wherein said insulating sheet is composed of polypropylene (PP), and wherein said wound electrode sheet deposition is kept at a temperature in the range of 30 to 160 degrees centigrade both inclusive.

19. The method as set forth in claim 16, wherein said insulating sheet has a multi-layered structure composed of a polypropylene film (PP), a polyethylene film (PE), and a polypropylene film (PP), and wherein said wound electrode sheet deposition is kept at a temperature in the range of 30 to 130 degrees centigrade both inclusive.

20. The method as set forth in claim 10, wherein said wound electrode sheet deposition is kept heated while compressed in said step (d).

21. A method of fabricating an electrode used for a prismatic cell, comprising the steps of:
(a) winding an electrode sheet around a core, said electrode sheet comprising a positive electrode in the form of a sheet, a negative electrode in the form of a sheet, and an insulating sheet sandwiched between said positive and negative electrodes;
(b) pulling out said core to thereby form a wound electrode sheet deposition;
(c) fixing said wound electrode sheet deposition in a mold;
(d) inserting said wound electrode sheet deposition and said mold into a bag composed of soft plastic;
(e) thermally sealing said wound electrode sheet deposition and said mold in said bag; and
(f) simultaneously compressing and heating said wound electrode sheet deposition, to thereby flatten said wound electrode sheet deposition.

22. The method as set forth in claim 21, wherein said wound electrode sheet deposition is kept compressed for a period of time ranging from 5 seconds to 180 seconds in said step (f).

23. The method as set forth in claim 21, wherein said wound electrode sheet deposition is compressed with a uniaxial pressure in said step (f).

24. The method as set forth in claim 21, wherein said wound electrode sheet deposition is compressed with an isotropic pressure in said step (f).

25. The method as set forth in claim 24, wherein said isotropic pressure is transferred through one of gas and fluid.

26. The method as set forth in claim 21, wherein said wound electrode sheet deposition is kept at a temperature equal to or lower than a melting temperature of said insulating sheet in said step (f).

27. The method as set forth in claim 26, wherein said insulating sheet is composed of polyethylene (PE), and wherein said wound electrode sheet deposition is kept at a temperature in the range of 30 to 130 degrees centigrade both inclusive.

28. The method as set forth in claim 26, wherein said insulating sheet is composed of polypropylene (PP), and wherein said wound electrode sheet deposition is kept at a temperature in the range of 30 to 160 degrees centigrade both inclusive.

29. The method as set forth in claim 26, wherein said insulating sheet has a multi-layered structure composed of a polypropylene film (PP), a polyethylene film (PE), and a polypropylene film (PP), and wherein said wound electrode sheet deposition is kept at a temperature in the range of 30 to 130 degrees centigrade both inclusive.

30. The method as set forth in claim 21, wherein said wound electrode sheet deposition is compressed in said step (f) under a vacuum condition.

31. The method as set forth in claim 21, wherein said bag is composed of thermoplastic polymer.

32. The method as set forth in claim 21, wherein said mold has an inner width smaller than an inner width of a cell case into which said wound electrode sheet deposition is to be inserted.

33. A method of fabricating an electrode used for a prismatic cell, comprising the steps of:
(a) winding an electrode sheet around a core, said electrode sheet comprising a positive electrode in the form of a sheet, a negative electrode in the form of a sheet, and an insulating sheet sandwiched between said positive and negative electrodes;
(b) pulling out said core to thereby form a wound electrode sheet deposition;
(c) fixing said wound electrode sheet deposition in a mold;
(d) inserting said wound electrode sheet deposition and said mold into a bag composed of soft plastic;
(e) thermally sealing said wound electrode sheet deposition and said mold in said bag;
(f) heating prior to compressing, said wound electrode sheet deposition; and then
(g) compressing said wound electrode sheet deposition to thereby flatten said wound electrode sheet deposition.

34. The method as set forth in claim 33, wherein said wound electrode sheet deposition is heated for 30 minutes or smaller in said step (f).

35. The method as set forth in claim 33, wherein said wound electrode sheet deposition is kept compressed for a period of time ranging from 5 seconds to 180 seconds in said step (g).

36. The method as set forth in claim 33, wherein said wound electrode sheet deposition is compressed with a uniaxial pressure in said step (g).

37. The method as set forth in claim 33, wherein said wound electrode sheet deposition is compressed with an isotropic pressure in said step (g).

38. The method as set forth in claim 37, wherein said isotropic pressure is transferred through one of gas and fluid.

39. The method as set forth in claim 33, wherein said wound electrode sheet deposition is kept at a temperature equal to or lower than a melting temperature of said insulating sheet in said step (f).

40. The method as set forth in claim 39, wherein said insulating sheet is composed of polyethylene (PE), and wherein said wound electrode sheet deposition is kept at a temperature in the range of 30 to 130 degrees centigrade both inclusive.

41. The method as set forth in claim 39, wherein said insulating sheet is composed of polypropylene (PP), and wherein said wound electrode sheet deposition is kept at a temperature in the range of 30 to 160 degrees centigrade both inclusive.

42. The method as set forth in claim 39, wherein said insulating sheet has a multi-layered structure composed of a polypropylene film (PP), a polyethylene film (PE), and a polypropylene film (PP), and wherein said wound electrode sheet deposition is kept at a temperature in the range of 30 to 130 degrees centigrade both inclusive.

43. The method as set forth in claim 33, wherein said wound electrode sheet deposition is compressed in said step (g) under a vacuum condition.

44. The method as set forth in claim 33, wherein said bag is composed of thermoplastic polymer.

45. The method as set forth in claim 33, wherein said wound electrode sheet deposition is kept heated while compressed in said step (g).

46. The method as set forth in claim 33, wherein said mold has an inner width smaller than an inner width of a cell case into which said wound electrode sheet deposition is to be inserted.

47. A method of fabricating an electrode used for a prismatic cell, comprising the steps of:
  (a) winding an electrode sheet around a core, said electrode sheet comprising a positive electrode in the form of a sheet, a negative electrode in the form of a sheet, and an insulating sheet sandwiched between said positive and negative electrodes;
  (b) pulling out said core to thereby form a wound electrode sheet deposition;
  (c) inserting said wound electrode sheet deposition into a bag composed of soft plastic;
  (d) thermally sealing said wound electrode sheet deposition in said bag;
  (e) fixing said wound electrode sheet deposition in a mold; and
  (f) simultaneously compressing and heating said wound electrode sheet deposition, to thereby flatten said wound electrode sheet deposition.

48. The method as set forth in claim 47, wherein said wound electrode sheet deposition is kept compressed for a period of time ranging from 5 seconds to 180 seconds in said step (f).

49. The method as set forth in claim 47, wherein said wound electrode sheet deposition is compressed with a uniaxial pressure in said step (f).

50. The method as set forth in claim 47, wherein said wound electrode sheet deposition is compressed with an isotropic pressure in said step (f).

51. The method as set forth in claim 50, wherein said isotropic pressure is transferred through one of gas and fluid.

52. The method as set forth in claim 47, wherein said wound electrode sheet deposition is kept at a temperature equal to or lower than a melting temperature of said insulating sheet in said step (f).

53. The method as set forth in claim 52, wherein said insulating sheet is composed of polyethylene (PE), and wherein said wound electrode sheet deposition is kept at a temperature in the range of 30 to 130 degrees centigrade both inclusive.

54. The method as set forth in claim 52, wherein said insulating sheet is composed of polypropylene (PP), and wherein said wound electrode sheet deposition is kept at a temperature in the range of 30 to 160 degrees centigrade both inclusive.

55. The method as set forth in claim 52, wherein said insulating sheet has a multi-layered structure composed of a polypropylene film (PP), a polyethylene film (PE), and a polypropylene film (PP), and wherein said wound electrode sheet deposition is kept at a temperature in the range of 30 to 130 degrees centigrade both inclusive.

56. The method as set forth in claim 47, wherein said wound electrode sheet deposition is compressed in said step (f) under a vacuum condition.

57. The method as set forth in claim 47, wherein said bag is composed of thermoplastic polymer.

58. The method as set forth in claim 47, wherein said mold has an inner width smaller than an inner width of a cell case into which said wound electrode sheet deposition is to be inserted.

59. A method of fabricating an electrode used for a prismatic cell, comprising the steps of:
  (a) winding an electrode sheet around a core, said electrode sheet comprising a positive electrode in the form of a sheet, a negative electrode in the form of a sheet, and an insulating sheet sandwiched between said positive and negative electrodes;
  (b) pulling out said core to thereby form a wound electrode sheet deposition;
  (c) inserting said wound electrode sheet deposition into a bag composed of soft plastic;
  (d) thermally sealing said wound electrode sheet deposition in said bag;
  (e) fixing said wound electrode sheet deposition in a mold;
  (f) heating prior to compressing said wound electrode sheet deposition; and then
  (g) compressing said wound electrode sheet deposition to thereby flatten said wound electrode sheet deposition.

60. The method as set forth in claim 59, wherein said wound electrode sheet deposition is heated for 30 minutes or smaller in said step (f).

61. The method as set forth in claim 59, wherein said wound electrode sheet deposition is kept compressed for a certain period of time in said step (g).

62. The method as set forth in claim 59, wherein said wound electrode sheet deposition is compressed with a uniaxial pressure in said step (g).

63. The method as set forth in claim 59, wherein said wound electrode sheet deposition is compressed with an isotropic pressure in said step (g).

64. The method as set forth in claim 63, wherein said isotropic pressure is transferred through one of gas and fluid.

65. The method as set forth in claim 59, wherein said wound electrode sheet deposition is kept at a temperature equal to or lower than a melting temperature of said insulating sheet in said step (f).

66. The method as set forth in claim 65, wherein said insulating sheet is composed of polyethylene (PE), and wherein said wound electrode sheet deposition is kept at a temperature in the range of 30 to 130 degrees centigrade both inclusive.

67. The method as set forth in claim 65, wherein said insulating sheet is composed of polypropylene (PP), and wherein said wound electrode sheet deposition is kept at a temperature in the range of 30 to 160 degrees centigrade both inclusive.

68. The method as set forth in claim 65, wherein said insulating sheet has a multi-layered structure composed of a polypropylene film (PP), a polyethylene film (PE), and a polypropylene film (PP), and wherein said wound electrode sheet deposition is kept at a temperature in the range of 30 to 130 degrees centigrade both inclusive.

69. The method as set forth in claim 59, wherein said wound electrode sheet deposition is compressed in said step (g) under a vacuum condition.

70. The method as set forth in claim 59, wherein said bag is composed of thermoplastic polymer.

71. The method as set forth in claim 59, wherein said wound electrode sheet deposition is kept heated while compressed in said step (g).

72. The method as set forth in claim 59, wherein said mold has an inner width smaller than an inner width of a cell case into which said wound electrode sheet deposition is to be inserted.

73. A method of fabricating an electrode used for a prismatic cell, comprising the steps of:
  (a) winding an electrode sheet around a core, said electrode sheet comprising a positive electrode in the form of a sheet, a negative electrode in the form of a sheet, and a porous plastic insulating sheet sandwiched between said positive and negative electrodes:
  (b) pulling out said core to thereby form a wound electrode sheet deposition; and (c) compressing said wound electrode sheet deposition with said wound electrode sheet deposition being kept heated, to thereby flatten said wound electrode sheet deposition.

74. The method as set forth in claim 73, wherein said wound electrode sheet deposition is heated in said step (c) at a temperature equal to or smaller than a melting temperature of said porous insulating sheet.

75. A method of fabricating an electrode used for a prismatic cell, comprising the steps of:

(a) winding an electrode sheet around a core, said electrode sheet comprising a positive electrode in the form of a sheet, a negative electrode in the form of a sheet, and a porous plastic insulating sheet sandwiched between said positive and negative electrodes;

(b) pulling out said core to thereby form a wound electrode sheet deposition;

(c) fixing said wound electrode sheet deposition in a mold; and (d) compressing said wound electrode sheet deposition with said wound electrode sheet deposition being kept heated, to thereby flatten said wound electrode sheet deposition.

76. The method as set forth in claim 75, wherein said wound electrode sheet deposition is heated in said step (d) at a temperature equal to or smaller than a melting temperature of said porous insulating sheet.

77. A method of fabricating an electrode used for a prismatic cell, comprising the steps of:

(a) winding an electrode sheet around a core, said electrode sheet comprising a positive electrode in the form of a sheet, a negative electrode in the form of a sheet, and a porous plastic insulating sheet, sandwiched between said positive and negative electrodes;

(b) pulling out said core to thereby form a wound electrode sheet deposition;

(c) inserting said wound electrode sheet deposition into a bag composed of soft plastic; and (d) compressing both said wound electrode sheet deposition and said soft plastic bag with both said wound electrode sheet deposition and said soft plastic bag being kept heated, to thereby flatten said wound electrode sheet deposition.

78. The method as set forth in claim 77, wherein said wound electrode sheet deposition is heated in said step (d) at a temperature equal to or smaller than a melting temperature of said porous insulating sheet.

79. The method as set forth in claim 77, wherein said wound electrode sheet deposition is compressed in said step (d) in vacuum condition.

80. The method as set forth in claim 77, wherein said wound electrode sheet deposition is heated for 30 minutes or smaller in said step (d).

81. The method as set forth in claim 77, wherein said wound electrode sheet deposition is compressed for 30 minutes or smaller in said step (d).

* * * * *